United States Patent [19]
Hardy

[11] Patent Number: 5,987,828
[45] Date of Patent: Nov. 23, 1999

[54] SELF-ADJUSTING TIE DOWN

[75] Inventor: Gary L. Hardy, Ventura, Calif.

[73] Assignee: Hardy Industries, Inc., Ventura, Calif.

[*] Notice: Under 35 U.S.C. 154(b), the term of this patent shall be extended for 00 days.

[21] Appl. No.: 08/989,285

[22] Filed: Dec. 12, 1997

[51] Int. Cl.⁶ .................................................. E02D 27/50
[52] U.S. Cl. .............................. 52/295; 52/698; 52/293.3
[58] Field of Search .............................. 52/295, 250, 264, 52/698, 293.3, 292, 567

[56] References Cited

U.S. PATENT DOCUMENTS

| | | | |
|---|---|---|---|
| 2,689,987 | 9/1954 | Berger | 52/567 X |
| 3,965,542 | 6/1976 | Gregory | 24/136 R |
| 4,812,096 | 3/1989 | Peterson | 411/231 |
| 5,051,047 | 9/1991 | Loncaric | 410/77 |
| 5,384,993 | 1/1995 | Phillips | 52/92.2 |
| 5,570,549 | 11/1996 | Lung et al. | 52/295 |
| 5,815,999 | 10/1998 | Williams | 52/223.13 |

*Primary Examiner*—Carl D. Friedman
*Assistant Examiner*—Dennis L. Dorsey
*Attorney, Agent, or Firm*—Lyon & Lyon LLP

[57] ABSTRACT

An apparatus for providing a self-adjusting tie down includes a bolt extending into a foundation and a nut on that bolt which is supported by two shims, one of which can move relative to the other. A spring exerts substantially constant force on the movable shim, preventing gaps from forming between the nut and the shims underneath.

22 Claims, 7 Drawing Sheets

SELF-ADJUSTING TIE DOWN

FIELD OF THE INVENTION

The invention generally relates to structural reinforcement for protecting wood-framed buildings.

BACKGROUND OF THE INVENTION

A typical wood-frame structure rests on a concrete foundation. The bottom framing element of each wall of the structure, which directly contacts the foundation, is called the sill. The sill can be attached to the foundation to prevent the structure from sliding off the foundation. Devices for attaching the sill to the foundation are referred to as hold-downs.

Presently, traditional bolt and nut systems are used to hold down the wooden sill of a wood-framed structure. First, a bolt is sunk into the foundation. Next, workers drill a hole in the sill for each bolt, and the sill is placed on the foundation so that the bolts pass through the holes. Finally, a nut is mated with each bolt and tightened securely against the sill. The downward pressure exerted on the sill by the nut holds the sill, and thereby the structure, in place. Consequently, the area of the sill directly underneath the nut is critical to the effectiveness of this hold-down system.

However, the wooden sill tends to deteriorate with age, for several reasons. The structure above the sill exerts a substantial weight on it. Over time, that weight alone can compress or crush the wooden sill. As the wood dries out, it can shrink; further, it may become more brittle, providing less resistance against the constant weight of the structure above. Termites or other insects may attack the sill, destroying its integrity and rendering it vulnerable to crushing. Hurricanes, tornados, and earthquakes can create severe shear stresses and uplifting forces in the walls of the structure, repeatedly forcing the sill against the nut and weakening, crushing, or splintering the wood directly underneath the nut. Overtightening the nut at the time of construction can crush or splinter the wood underneath the nut, precisely where the nut and bolt system requires a snug fit in order to function.

As the sill deteriorates, and as the wooden area underneath the nut deteriorates, the position of the nut remains constant relative to the bolt. Consequently, a gap forms between the nut and the sill. This gap significantly weakens the hold-down mechanism. It allows the sill, and the structure, to shift relative to the foundation. The resultant fatigue loads cause the sill to deteriorate further underneath the nut, widening the gap and rendering the hold-down progressively weaker. When strong forces such as those produced by a hurricane, tornado, or earthquake create severe shear and uplift forces in the wood-framed structure, the gap between the nut and the sill destroys the functionality of the hold-down by allowing those shear and uplift forces to shake the structure up and down, increasing the likelihood of its damage or destruction.

SUMMARY OF THE INVENTION

The present invention is directed toward a self-adjusting tie down for securing a frame, column or post onto a wooden sill plate.

In a first aspect of the invention, a tie down includes a bolt sunk into a foundation extending through a fixed shim and a movable shim. A nut is tightened against the shims and a spring exerts force against the movable shim to prevent gaps from forming between the nut and the shims below.

In a second aspect of the invention, the fixed shim and the movable shim in the prior aspect vary inversely in thickness. The surfaces of the two shims which contact each other possess steps of substantially the same dimension, enabling the surfaces to come into contact across substantially all of their area. These steps allow the spring to push the movable shim along the lower shim in fixed increments, thereby preventing a gap from forming between the movable shim and the nut, and prevent the movable shim from backing off under load.

In a third aspect of the invention, the spring exerts a substantially continuous force against the movable shim, which in turn exerts a substantially continuous force against the nut, keeping the bolt in substantially continuous tension.

DETAILED DESCRIPTION OF THE PREFERRED EMBODIMENTS

Figure 1:
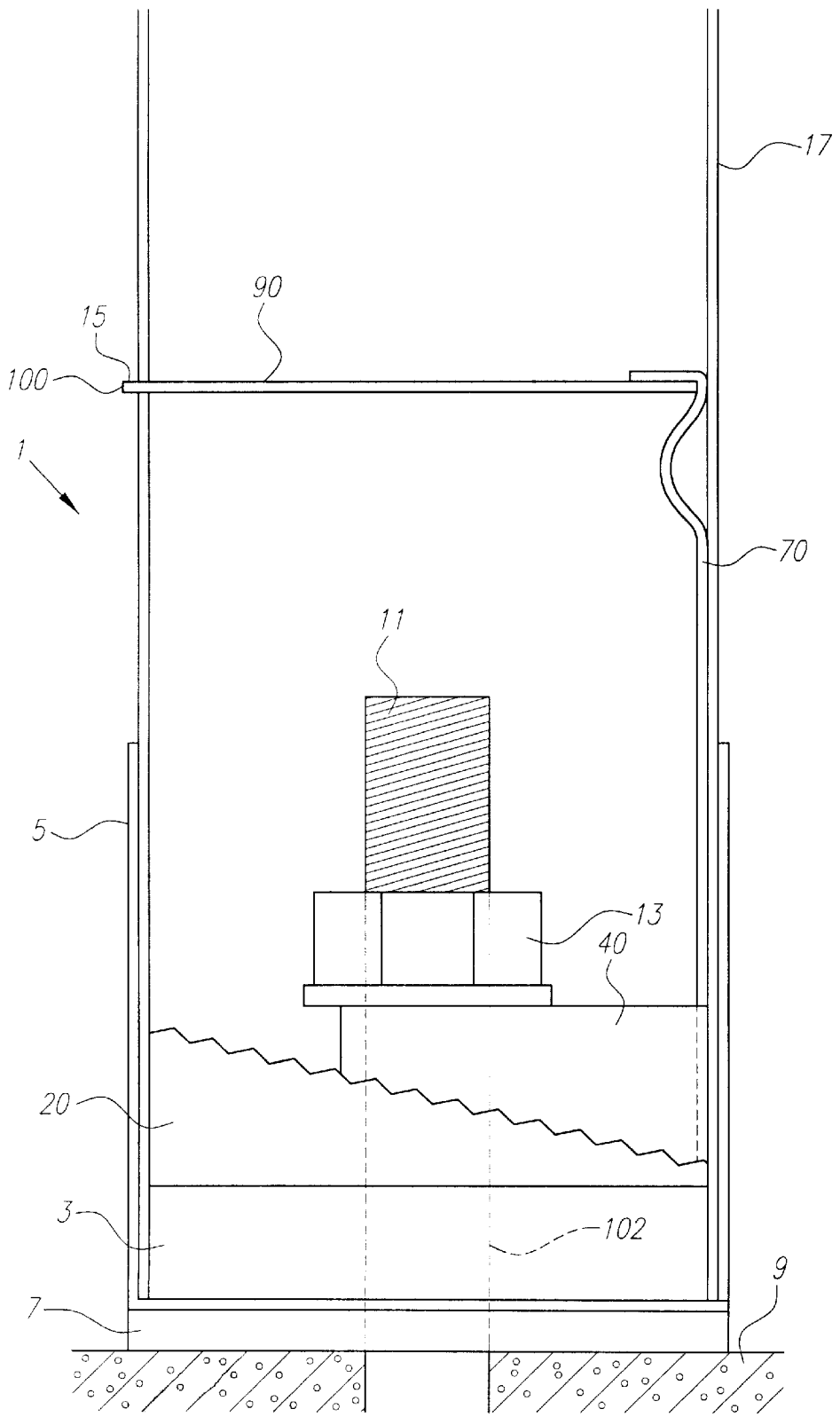
FIG. 1 is a side view of a self-adjusting hold down bolt.

Referring now to the drawings, FIG. 1 shows the preferred embodiment of a self-adjusting tie down 1. A lower shell 5 caps the bottom end of a hollow column 17. Preferably, both the lower shell 5 and the hollow column 17 are a portion of an integral metallic framing unit, such as a shear frame. However, the self-adjusting tie down 1 may be used with any metal framing strategy which includes hollow columns, such as hollow steel studs assembled on site into "C"-channel steel members resting on a foundation or steel hold-downs. It may also be used with a mixed metal and wood framing strategy.

A plate washer 3, with a slot 102 through its approximate center, rests on the interior bottom surface of the lower shell 5 which also has an opening in the bottom plate that is conveniently a slot to accommodate misalignment. The plate washer 3 is advantageously tack-welded onto the lower shell 5.

A fixed lower shim 20 rests on the top surface of the plate washer 3 within the lower shell 5. The dimensions of both the plate washer 3 and the fixed lower shim 20 are such that the vertical walls of the lower shell 5 hold the plate washer 3 and the fixed lower shim 20 in place and prevent their lateral and longitudinal motion.

A movable upper shim 40 rests on the sloped top surface of the fixed lower shim 20. The bottom surface of the movable upper shim 40 is also sloped, and possesses a slope substantially the same as that of the fixed lower shim 20. The movable upper shim 40 is shorter than the fixed lower shim 20 in the direction in which it is sloped, and possesses approximately the same dimension as the fixed lower shim 20 in the perpendicular non-vertical direction. Preferably, the fixed lower shim 20 and the movable upper shim 40 are steel.

A bolt 11 is embedded in a foundation 9, then passes through a wooden sill plate 7 the lower shell 5, the plate washer 3, the fixed lower shim 20, and the movable upper shim 40. A nut 13 is attached to the bolt 11, and during installation of the self-adjusting tie down 1 the nut 13 is tightened down against the movable upper shim 40. The hollow column 17 is open on one side next to and for a short distance above the bolt 11 to enable access to the bolt 11 for installation with a wrench.

A leaf spring 70 presses against the movable upper shim 40 at one end, and at its other end is pressed between a spring locking plate 90 and the interior wall of the hollow column 17. The spring locking plate 90 has a tab 100 on one side. The tab 100 fits into a slot 15 in the wall of the hollow column 17, thereby holding the spring locking plate 90 in place.

As seen in FIG. 2, the fixed lower shim 20 generally possesses the shape of a trapezoidal solid. The fixed lower shim 20 has a front surface 22, a right surface 24, a rear surface 26, and a left surface 28, as well as a bottom surface 30 and a sloping top surface 32. Preferably, the top surface 32 slopes downward from left to right by parallel, equidistant steps 34. The fixed lower shim 20 has an oblong hole 36 that extends through the entire fixed lower shim 20, piercing through the top surface 32 and the bottom surface 30.

Figure 2A:
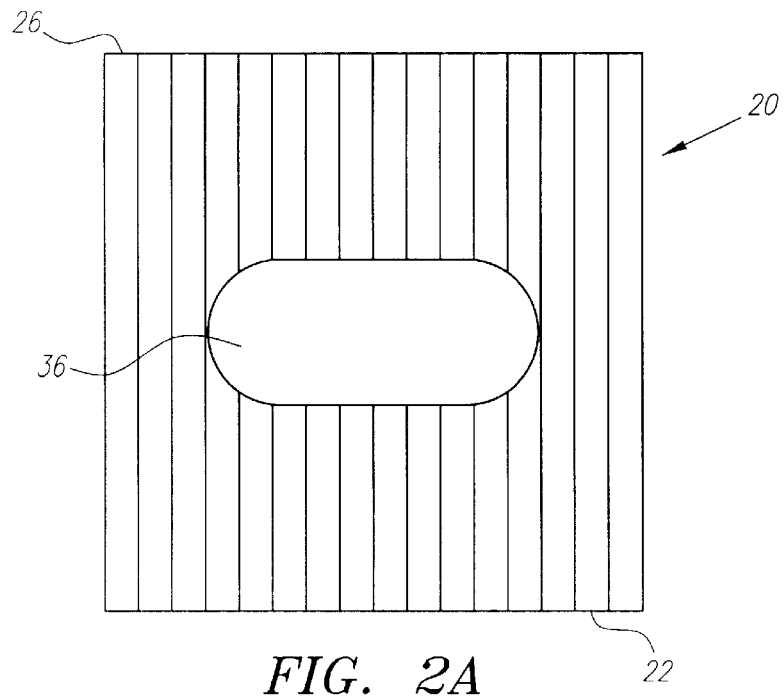
FIG. 2A is a plan view of a fixed lower shim.
Figure 2B:
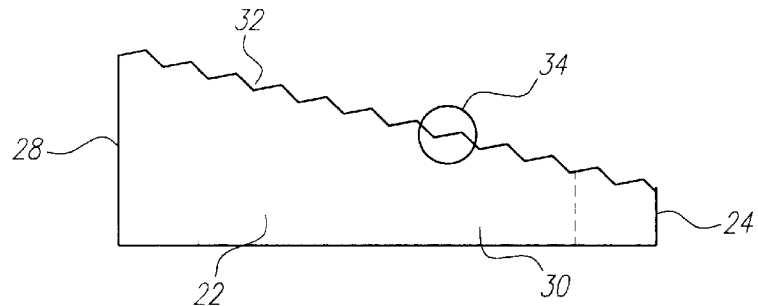
FIG. 2B is a side view of the fixed lower shim.
Figure 2C:
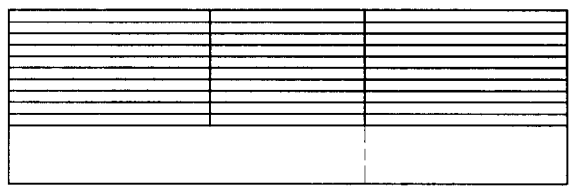
FIG. 2C is an end view of the fixed lower shim.
Figure 2D:
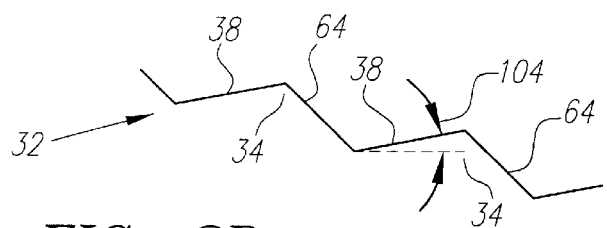
FIG. 2D is a detail drawing of the steps located on the fixed lower shim.

FIG. 2A shows a detailed view of the top surface 32 of the fixed lower shim 20. Each step 34 is composed of a terrace 38 and an angled riser 64. Each angled riser 64 advantageously forms an angle of about 135 degrees relative to the terrace 38 at its lower edge. This angle is understood not to be critical. A stronger spring would allow a steeper angle. Each terrace 38 has a substantially equal width, and extends across substantially the entire length of the fixed lower shim 20. All terraces 38 are substantially parallel to the others. Preferably, each terrace 38 is not perfectly horizontal, instead inclining upward by a small angle 104. The angle 104 is advantageously less than 10 degrees. The angle 104 of each terrace 38 prevents the movable upper shim 40 from sliding downward over the sloping top surface 32 of the fixed lower shim 20. Each angled riser 64 has a substantially equal height and width, and extends across substantially the entire length of the fixed lower shim 20. All flat angled risers 64 are substantially parallel to the others.

Figure 3A:
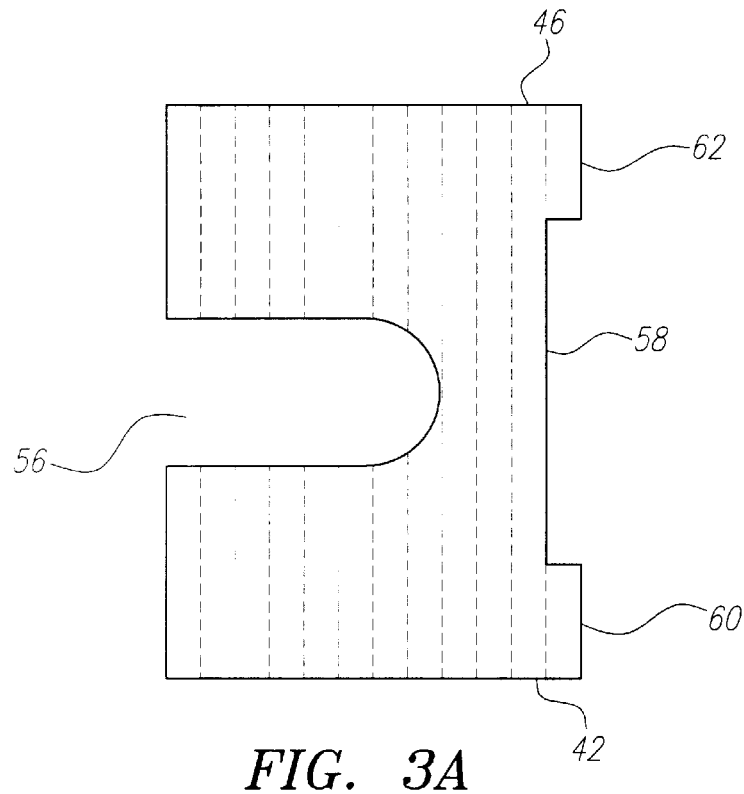
FIG. 3A is a plan view of a movable upper shim.
Figure 3B:
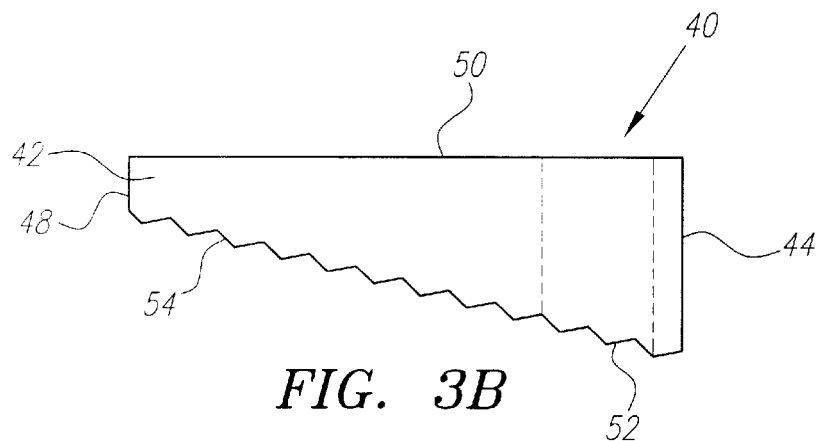
FIG. 3B is a side view of the movable upper shim.
Figure 3C:
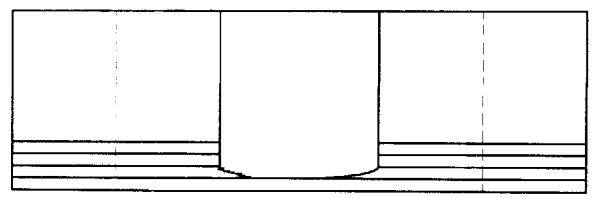
FIG. 3C is an end view of the movable upper shim.

As seen in FIG. 3, the movable upper shim 40 generally possesses the shape of a trapezoidal solid. The movable upper shim 40 has a front surface 42, a right surface 44, a rear surface 46, and a left surface 46, as well as a top surface 50 and a sloping bottom surface 52. Preferably, the bottom surface 52 slopes downward from left to right by parallel, equidistant steps 54. A slot 56 in the movable upper shim 40 extends through the entire movable upper shim 40, piercing the top surface 50 and the sloping bottom surface 52 and dividing the left surface 48 into two substantially equal segments. The movable upper shim 40 possesses two protrusions, a first protrusion 60 and a second protrusion 62, protruding vertically from both the front and rear of the right surface 44. A shallow cutout 58 is between the first protrusion 60 and the second protrusion 62. The steps 54 in the bottom surface 52 possess substantially the same characteristics as the steps 34 in the top surface of the fixed lower shim 20. The steps 54 possess substantially the same dimensions and angular relationships.

Figures 4A, 4B:
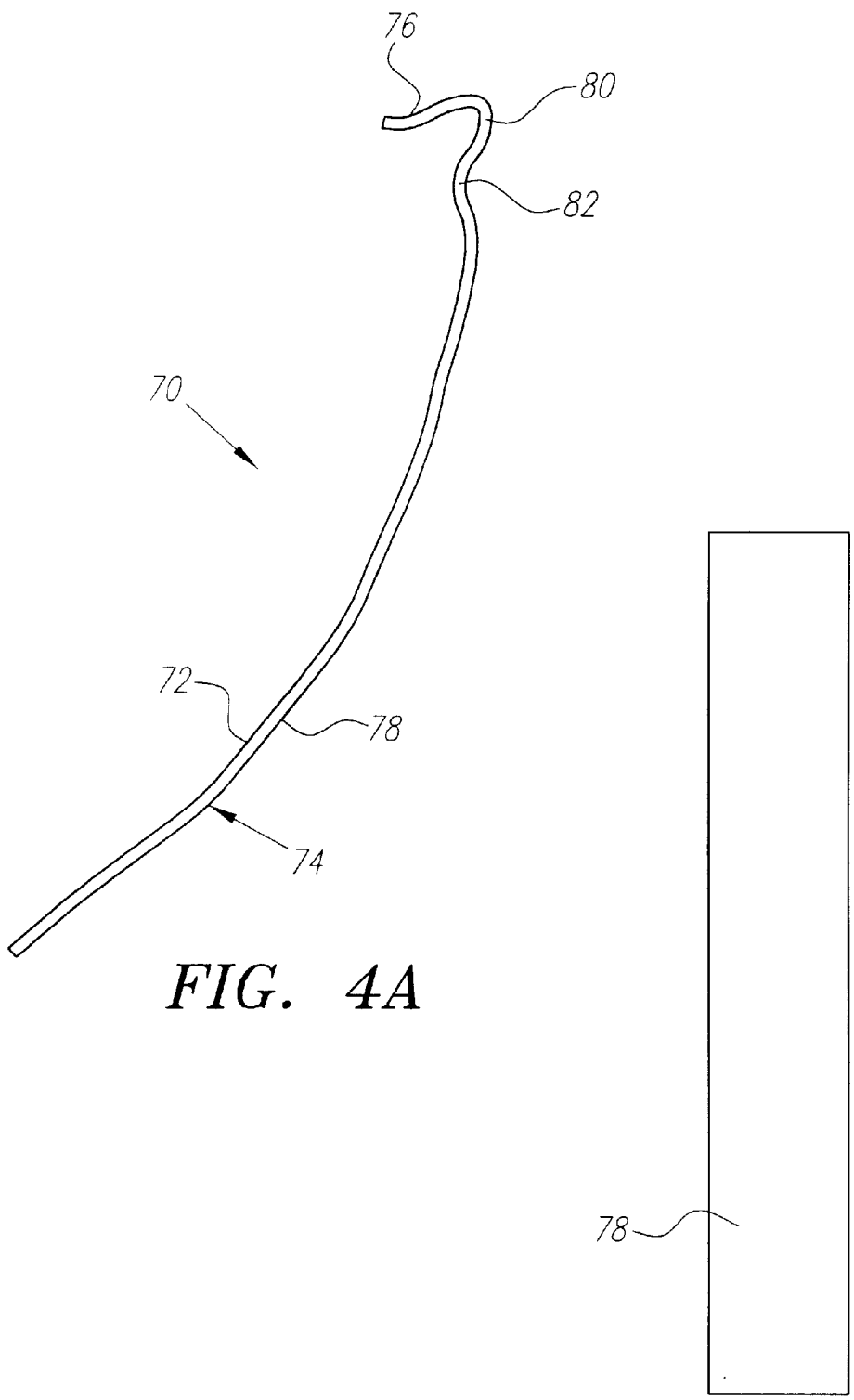
FIG. 4A is a side view of a tension spring component of the self-adjusting hold down bolt.
FIG. 4B is a plan view of the component of FIG. 4A.

Turning now to FIG. 4, a leaf spring 70 is shown. The spring 70 advantageously has an inner surface 72, an outer surface 74, a head 76, a body 78, a bend 80, and a neck 82. Preferably, the spring 70 possesses a constant width and thickness for ease of manufacturing. However, a spring of variable width or thickness may be used if desired. The body 78 of the spring 70 fits into the cutout 58 of the movable upper shim 40, which is shown in FIG. 3. The spring 70 is sized such that the bottom end of the body 78 does not touch the fixed lower shim 20. As shown in FIG. 3, the first protrusion 60 and the second protrusion 62 prevent the leg 82, and thereby the spring 70, from moving laterally in the directions of the first protrusion 60 and the second protrusion 62.

Figure 5A:
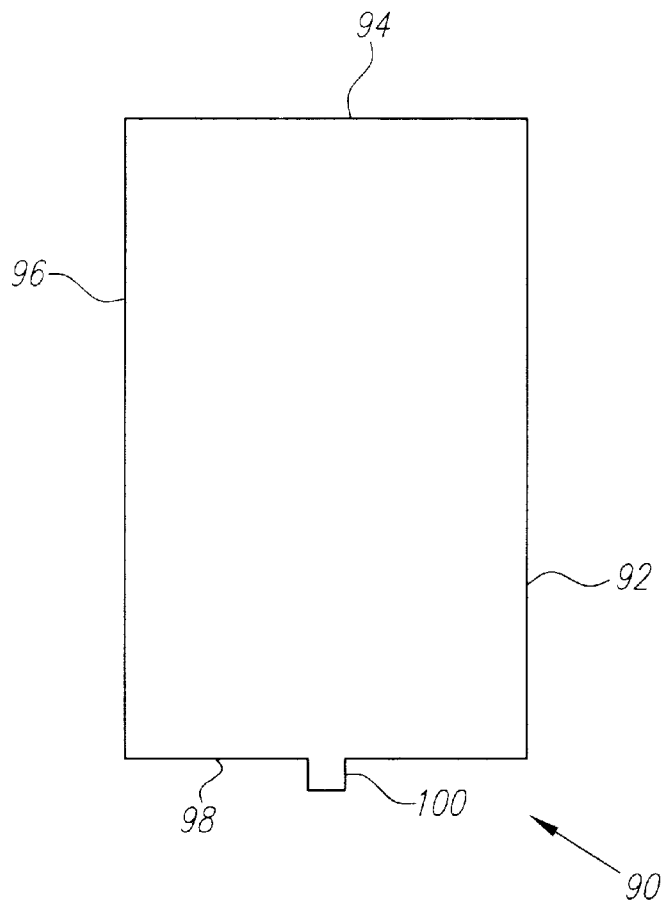
FIG. 5A is a plan view of the spring locking member.
Figure 5B:
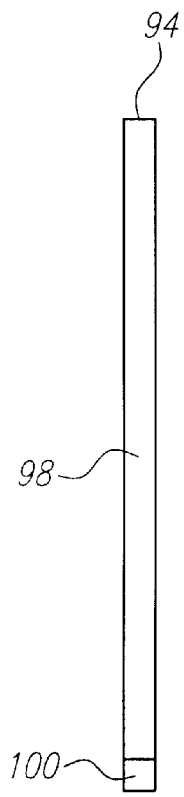
FIG. 5B is a side view of the spring locking member.

Turning now to FIG. 5, a spring locking member 90 is shown. The spring locking member 90 has four lateral surfaces: front surface 92, right surface 94, rear surface 96, and left surface 98. The left surface 98 has a tab 100 protruding from its approximate center. Preferably, the spring locking member 90 is metallic, but any material with sufficient strength and durability may be used.

As shown in FIG. 1, the spring locking member 90 is attached to the hollow column 17. The tab 100 protruding from the spring locking member 90 locks into a groove 15 in the hollow column 17. Further, the right surface 94 of the spring locking member 90 protrudes into the bend 80 of the spring 70, protruding past the bump formed by the neck 82 and abutting the inner surface 72 of the spring 70. Consequently, the spring locking member 90 rests on the neck 82 of the spring 70. When the spring 70 has been locked into this position, it is said to be loaded. After the spring 70 has been loaded, the outer surface 74 of the spring 70 is pressed firmly against the inner surface of the hollow column 17. The spring locking member 90 thus holds the head 76 of the spring 70 securely in place. With the head 76 prevented from moving, the inner surface 72 of opposite end of the spring 70 exerts force against the movable upper shim 40.

Figure 6:
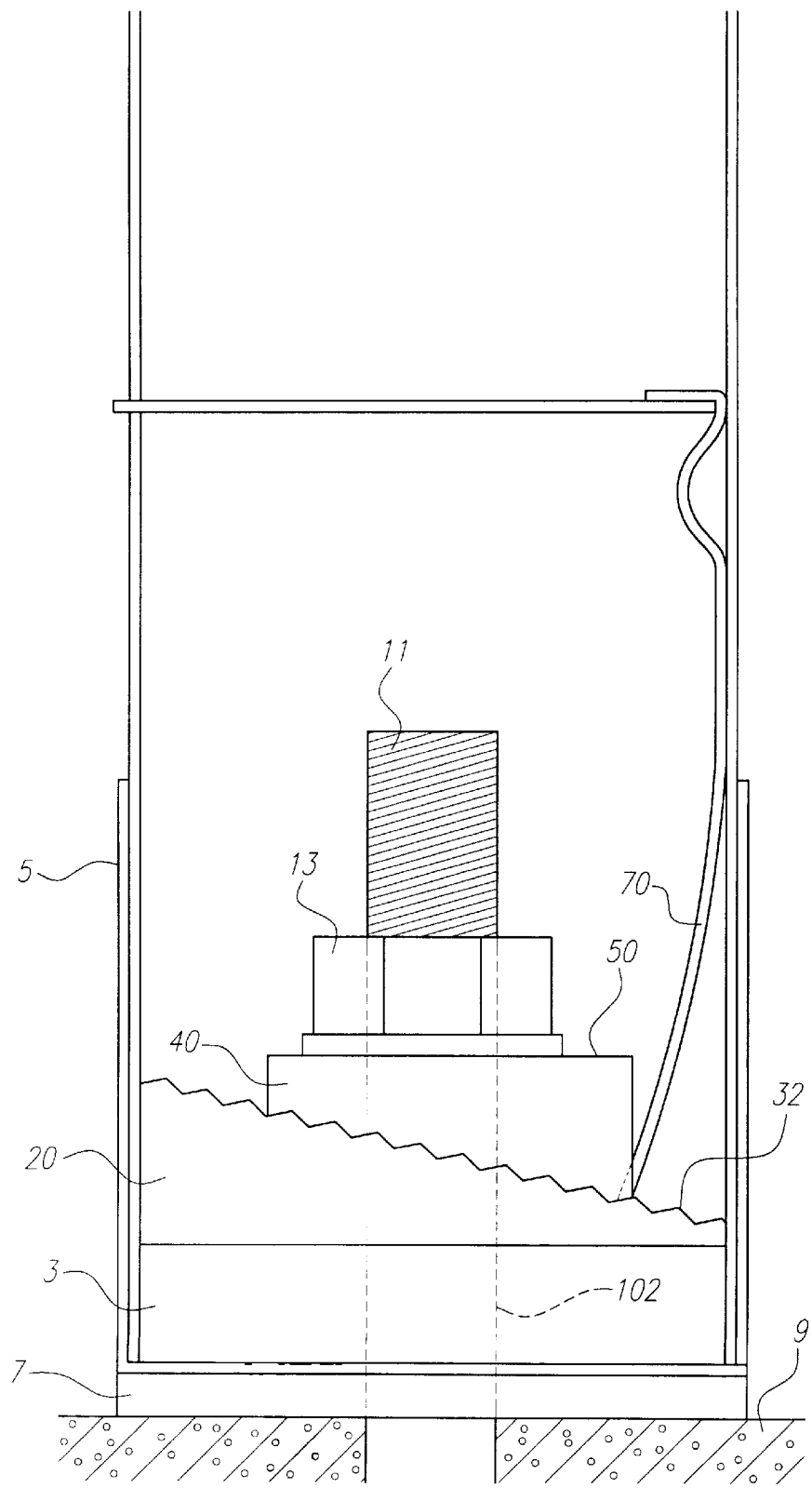
FIG. 6 is a side view showing the configuration of the self-adjusting hold down bolt after deterioration of or damage to the wooden bottom plate underneath.

FIG. 6 shows the operation of the self-adjusting tie down 1. The leaf spring 70 exerts a constant lateral force against the movable upper shim 40, attempting to push the movable upper shim up the sloped top surface 32 of the fixed lower shim 20. However, the nut 13 holds the movable upper shim 40 in place as the top surface 50 of the movable upper shim 40 presses against it as a result of the lateral force exerted by the spring 70. As a result of the substantially constant force exerted against the movable upper shim 50 by the spring 70, the movable upper shim 50 exerts a substantially constant force against the nut 13 and the fixed bottom shim 20.

The wooden sill plate 7 may lose thickness or integrity with time, for reasons such as, e.g., shrinkage, compression, or earthquake. As it does so, the lower shell 5 moves downward as it continues to rest on the wooden sill plate 7. Consequently, the plate washer 3 and the fixed bottom shim 20 move downward as well. However, the nut 13 stays in a constant position on bolt 11. As a result, the space between the fixed bottom shim 20 and the nut 13 increases. As that space increases, the spring 70 continues to exert a lateral force against the movable upper shim 40. Therefore, the movable upper shim 40 moves upward along the top surface 32 of the lower shim 40 until its motion is stopped by the nut 13.

Figure 6A:
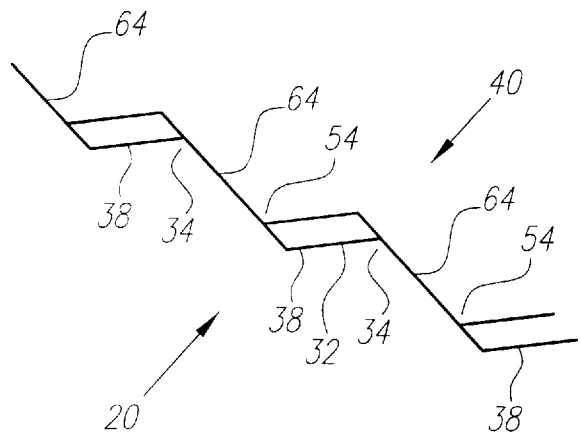
FIG. 6A is a detail of the interface between a movable upper shim and a fixed lower shim.

As shown in FIG. 6A, as the movable upper shim 40 slides upward along top surface 32, the steps 54 on its bottom surface 52 engage the steps 34 on the top surface 32 of the fixed lower shim 20 in a different manner. The terraces 38 of the fixed lower shim 20 no longer touch the corresponding surfaces of the bottom surface 52 of the movable upper shim 40 as the leaf spring 70 pushes the movable upper shim 40 laterally. The angled risers 64 of the fixed lower shim 20, and the corresponding angled risers of the movable upper shim 40 partially convert the lateral force exerted by the spring 70 into an upward force, allowing the movable upper shim 40 to slide laterally as well as upward. Consequently, gaps temporarily exist between the flat horizontal surfaces 38 of the top surface 32 of the fixed lower shim 20 and the corresponding horizontal surfaces of the movable upper shim 40. However, when such gaps exist, less surface area is in contact between the top surface 32 of the fixed lower shim 20 and the bottom surface 52 of the movable upper shim 40, and consequently less friction exists between the top surface 32 and the bottom surface 52. This lessened friction allows the movable upper shim 40 to complete its travel more easily and come to rest in a new interlocking position in which the terraces 38 of the top surface 32 of the fixed lower shim 20 are in contact with the next higher set of corresponding surfaces of the movable upper shim 40.

Referring again to FIG. 6, the self-adjusting tie down 1 thereby prevents gaps from forming between the nut 13 and the movable upper shim 40, and continuously ensures a tight fit between the nut 13 and the movable upper shim 40.

Figure 7:
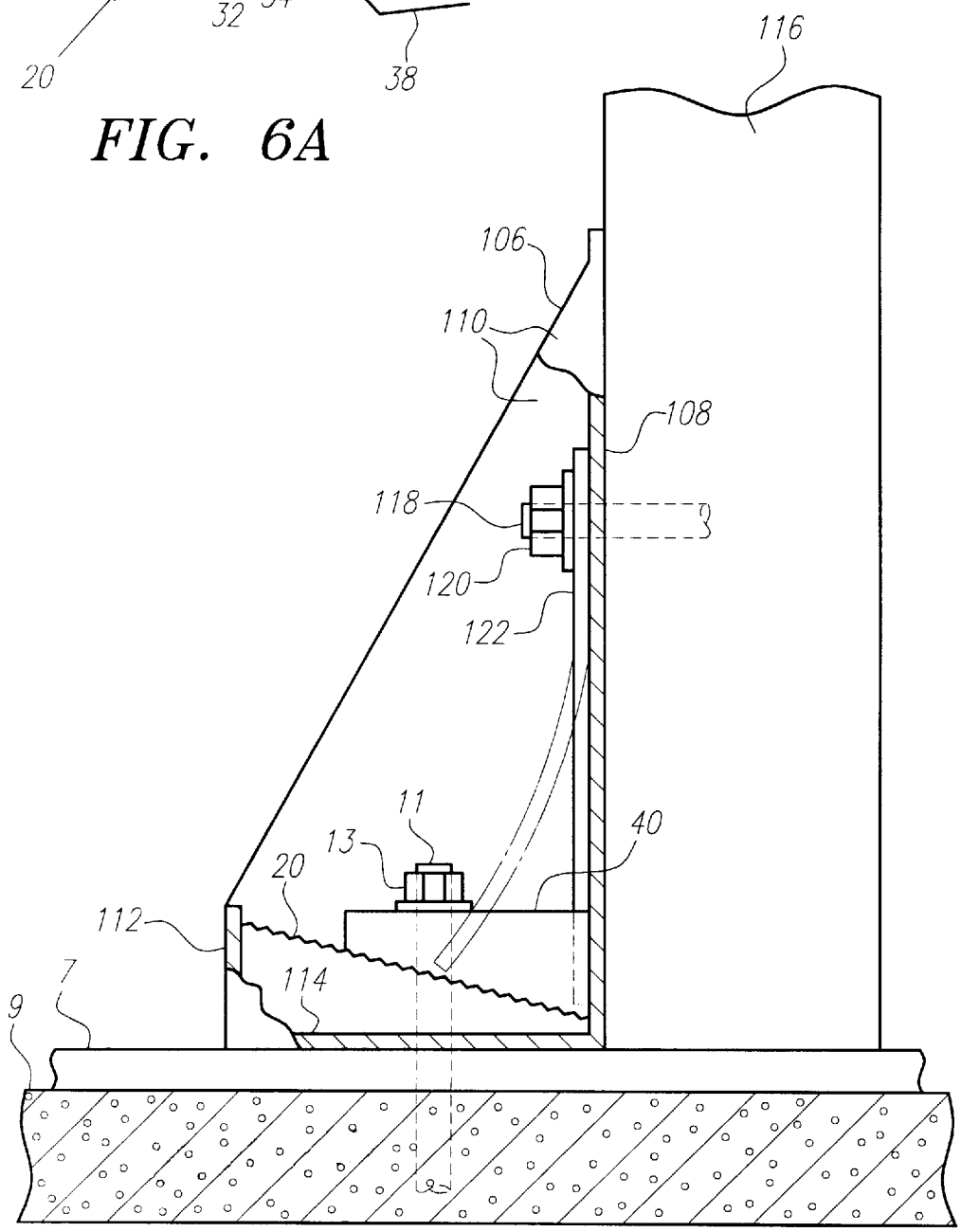
FIG. 7 is a side view partially broken for clarity of a second embodiment associated with a hold-down with the spring in the relaxed state illustrated in phantom.

FIG. 7 illustrates a second embodiment which is specifically associated with a tie down 106. The tie down 106 has an attachment wall 108 and two roughly triangular sidewalls or webs 110. A low front wall 112 completes an enclosure positioned above a base plate 114. The several components are structurally integral. A lower shim 20 and upper shim 40 are configured as with the first embodiment and receive a bolt 11 with a nut 13. This structure rests upon a sill 7 with the bolt 11 embedded in the foundation 9.

The attachment wall 108 of the tie down 106 is positioned against a post 116. A bolt 118 attaches to the post 116 and extends through a hole in the attachment wall 108. A nut 120 secures the tie down 106 to the bolt 118 and in turn the post 116. A leaf spring 122 is fastened behind the nut 120. This spring 122 extends downwardly to adjacent the upper shim 40. The spring 122 is bowed such that in the position shown in FIG. 7 it is placed under substantial flexure by the upper shim 40. The tie down 106 is thus available for solid posts as well as other components needing lateral attachment.

Preferred self-adjusting tie downs and many attendant advantages have thus been disclosed. It will be apparent, however, that various changes may be made in the form, construction, and arrangement of the parts without departing from the spirit and scope of the invention, the form hereinbefore described being merely a preferred or exemplary embodiment thereof. Therefore, the invention is not to be restricted or limited except in accordance with the following claims.

What is claimed is:

1. A self-adjusting tie down comprising
    a lower shim having an inclined top surface, the top surface defining a plurality of steps oriented perpendicular to the direction in which the fixed lower shim increases in thickness;
    a upper shim having an inclined bottom surface positioned against the top surface of the lower shim, the lower surface of the upper shim defining a plurality of steps oriented perpendicular to the direction in which the upper shim decreases in thickness, one shim including a hole therethrough and the other shim including a slot therethrough:
    a bolt passing through the hole and the slot;
    a nut engaging the bolt and abutting the top surface of the upper shim; and
    a spring biased against the shim including the slot.

2. The self-adjusting tie down of claim 1 further comprising
    a hollow column, the lower shim, the upper shim, the nut, and the spring being located within the hollow column; and
    a slotted lower shell attached to the base of the hollow column.

3. The self-adjusting tie down of claim 2, the lower shim increasing in thickness in the direction away from the spring, the upper shim decreasing in thickness in the direction away from the spring in the same ratio as the lower shim, the bottom surface of the upper shim slidably engaging the top surface of the lower shim.

4. The self-adjusting tie down of claim 1 further comprising
    a hollow column;
    a slotted lower shell attached to the base of the column; and
    a spring locking member, one end of the spring locking member being attached to the hollow column and the other end of the spring locking member being pressure-fit between the spring locking member and an interior wall of the column and the other end of the spring being biased against the shim including the slot.

5. The self-adjusting tie down of claim 1, the spring being a leaf spring.

6. The self-adjusting tie down of claim 1, further comprising
    a plate washer abutting the bottom surface of the fixed lower shim.

7. The self-adjusting tie down of claim 1 further comprising
    a base plate; and
    an attachment wall extending perpendicular to the base plate, the lower shim being positioned on the base plate.

8. The self-adjusting tie down of claim 7, further comprising one or more webs extending from the attachment wall to the base plate.

9. The self-adjusting tie down of claim 7, further comprising one or more webs extending from the attachment wall to the base plate.

10. The self-adjusting tie down of claim 1, wherein each step possesses a substantially horizontal terrace and a riser forming an angle of substantially 135 degrees relative thereto.

11. The self-adjusting tie down of claim 1, wherein the upper shim is shorter than the lower shim in the dimension along which the lower shim increases in thickness.

12. The self-adjusting tie down of claim 1, wherein the lower shim is fixed and the spring is biased against the upper shim.

13. A self-adjusting tie down, comprising:
    a fixed lower shim including a hole therethrough and an inclined upper surface;
    a movable upper shim including a slot therethrough and an inclined lower surface positioned against the inclined upper surface of the fixed lower shim, the fixed lower shim and the movable upper shim changing in thickness by substantially equidistant steps of substantially equal size, the steps being oriented substantially perpendicular to the direction along which the fixed lower shim increases in thickness and extending across substantially the entire width of the fixed lower shim and the movable upper shim;

a bolt passing through the hole and the slot;

a nut engaging the bolt and abutting the movable upper shim; and a spring biased against the movable upper shim to press the movable upper shim against the nut and against the fixed lower shim.

14. The self-adjusting tie down of claim 13 further comprising
 a hollow column; and
 a slotted lower shell attached to the base of the column, the lower shim, the upper shim, the nut, and the spring being located within the hollow column.

15. The self-adjusting tie down of claim 13, the lower shim increasing in thickness in the direction away from the spring, the upper shim decreasing in thickness in the direction away from the spring in the same ratio as the lower shim, the bottom surface of the upper shim slidably engaging the top surface of the lower shim.

16. The self-adjusting tie down of claim 13 further comprising
 a hollow column;
 a slotted lower shell attached to the base of the column; and
 a spring locking member, one end of the spring locking member being attached to the hollow column and the other end of the spring locking member being pressure-fit against the spring, one end of the spring being trapped between the spring locking member and an interior wall of the column and the other end of the spring being biased against the movable upper shim.

17. The self-adjusting tie down of claim 13, the spring being a leaf spring.

18. The self-adjusting tie down of claim 13, further comprising a plate washer abutting the bottom surface of the lower shim.

19. The self-adjusting tie down of claim 13 further comprising
 a base plate; and
 an attachment wall extending perpendicular to the base plate, the lower shim being positioned on the base plate.

20. A self-adjusting tie down, comprising:
 a fixed lower shim including a hole therethrough and an inclined upper surface:
 a movable upper shim including a slot therethrough and an inclined lower surface positioned against the inclined upper surface of the fixed lower shim;
 a bolt passing through the hole and the slot;
 a nut engaging the bolt and abutting the movable upper shim;
 a spring biased against the movable upper shim to press the movable upper shim against the nut and against the fixed lower shim;
 a base plate and an attachment wall extending perpendicular to the base plate, the fixed lower shim being positioned on the base plate, the attachment wall located adjacent to a workpiece post;
 a second bolt extending through the attachment wall and fixed to the workpiece post; and
 a second nut received by the second bolt, the spring being held in place by the second bolt and extending to the movable upper shim.

21. A self-adjusting tie down comprising
 a hollow frame including an opening in its bottom;
 a spring locking member attached to the hollow column;
 a leaf spring, one end of which is held by the spring locking member;
 a fixed lower shim resting within the interior of the hollow frame and located adjacent to one end of the spring, the fixed lower shim increasing in thickness in the direction away from the spring by substantially equidistant steps of substantially equal size, the steps being oriented substantially parallel to one another and substantially perpendicular to the direction along which the fixed lower shim increases in thickness and extending across substantially the entire width of the fixed lower shim, the fixed lower shim including a hole therethrough;
 a slotted plate washer located between the fixed lower shim and the hollow frame;
 a bolt passing through the opening in the bottom of the hollow frame, the slotted plate washer, and the hole in the fixed lower shim;
 a movable upper shim, against which the opposite end of the leaf spring is biased to exert a substantially lateral force, the movable upper shim decreasing in thickness by steps of dimensions substantially equal to those formed in the fixed lower shim in a direction away from the side of the fixed lower shim against which the leaf spring is biased, the lower surface of the movable upper shim slideably engaging the top surface of the fixed lower shim, the moveable upper shim including a slot enabling the moveable upper shim to move relative to the bolt to maintain tension on the bolt; and
 a nut engaging the bolt and abutting the top surface of the movable upper shim.

22. The self-adjusting tie down of claim 21, the hollow frame further including a hollow column and a lower shell.

* * * * *